United States Patent
Ariki et al.

(10) Patent No.: US 6,402,266 B1
(45) Date of Patent: Jun. 11, 2002

(54) VEHICLE BRAKE APPARATUS WITH ROTARY PUMP

(75) Inventors: Fumiyoshi Ariki, Anjo; Hiroyuki Shinkai, Obu, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/613,338

(22) Filed: Jul. 7, 2000

(30) Foreign Application Priority Data

Jul. 9, 1999 (JP) .......................................... 11-196347

(51) Int. Cl.[7] .............................................. B60T 8/40
(52) U.S. Cl. ............................ 303/116.4; 303/DIG. 10
(58) Field of Search ...................... 303/116.4, DIG. 10; 418/166, 171, 189, 210

(56) References Cited

U.S. PATENT DOCUMENTS

| | | | | |
|---|---|---|---|---|
| 4,019,840 A | * | 4/1977 | Christy ........................ | 418/241 |
| 4,200,427 A | * | 4/1980 | Binger et al. ................ | 418/32 |
| 4,619,588 A | * | 10/1986 | Moore, III .................. | 417/366 |
| 4,673,342 A | * | 6/1987 | Saegusa ...................... | 418/150 |
| 4,697,995 A | * | 10/1987 | Tuckey ........................ | 418/15 |
| 4,968,233 A | | 11/1990 | Nakayoshi et al. | |
| 5,501,585 A | | 3/1996 | Ogawa et al. | |
| 5,593,216 A | * | 1/1997 | Hosoya et al. ........... | 303/119.2 |
| 5,918,949 A | * | 7/1999 | Volz et al. ................ | 303/115.4 |
| 6,059,380 A | * | 5/2000 | Pueschel et al. ......... | 303/113.2 |
| 6,068,461 A | * | 5/2000 | Haga et al. .................. | 418/180 |

FOREIGN PATENT DOCUMENTS

JP          60-38186          3/1985

* cited by examiner

*Primary Examiner*—Christopher P. Schwartz
*Assistant Examiner*—Benjamin A. Pezzlo
(74) *Attorney, Agent, or Firm*—Law Office of David G. Posz

(57) ABSTRACT

In a pump apparatus having a plurality of rotary pumps, an axis of a drive shaft is disposed perpendicularly to the gravity direction and the respective intake and discharge ports of the pumps extend in a direction opposite to the gravity direction. A housing, in which the pumps are contained, is provided with brake fluid passages connected to the intake and discharge ports, respectively. The respective brake fluid passages also extend in a direction opposite to the gravity direction. As a result, air entered into brake fluid may be easily purged through the intake and discharge ports and the brake fluid passages.

11 Claims, 4 Drawing Sheets

VEHICLE BRAKE APPARATUS WITH ROTARY PUMP

CROSS REFERENCE TO RELATED APPLICATION

This application is based upon and claims the benefit of priority of Japanese Patent Applications No. H.11-196347 filed on Jul. 9, 1999, the content of which is incorporated herein by reference.

BACKGROUND OF THE INVENTION

1. Field of the Invention

The present invention relates to a vehicle brake apparatus for controlling brake pressure with rotary pumps such as trochoid pumps.

2. Description of Related Art

In a conventional vehicle brake apparatus having a anti-skid control (hereinafter called ABS) actuator, plunger type pumps have been utilized as pumps for the ABS actuator. However, according to a recent demand of a more compact ABS actuator whose volume efficiency is higher, rotary pumps such as trochoid pumps, have become promising in place of the plunger type pumps having a limit for further improvement.

In each of the rotary pumps such as the trochoid pumps, the pump is formed in a near round shape, inlet and outlet of the pump are generally positioned symmetrically and fluid passages constituting intake and discharge ports of the pump extending from the inlet and outlet are also arranged symmetrically with respect to a diameter direction of the near round shape.

However, the rotary pump having such a construction has a problem that, when air is invaded into the inside of the pump, the air can not be easily purged since the intake and discharge ports or at least the discharge port does not extend in a direction opposite to a gravity direction.

SUMMARY OF THE INVENTION

An object of the present invention is to provide a vehicle brake apparatus with a plurality of rotary pumps each having a construction that air may be easily purged from the inside of the pump in a direction opposite to a gravity direction.

To achieve the object, a drive shaft for driving the plurality of the rotary pumps extends perpendicularly to the gravity direction and respective discharge ports of the rotary pumps extend in a direction opposite to the gravity direction.

It is preferable that brake fluid passages of the housing, where the plurality of the rotary pumps are housed and each of which is connected to each of the intake and discharge ports, extend in an opposite direction to the gravity direction.

To form the discharge port of each of the rotary pump as mentioned above, each of a pair of side plates is provided, at an end surface thereof on a side of a rotating portion (inner and outer rotors), with a ring shaped first groove formed so as to surround the drive shaft. Sealing members are disposed in the first grooves of the side plates so that the inner and outer rotors of each of the rotary pumps may be put between the pair of the sealing members and a groove space may be formed between the first groove and the sealing member in each of the side plates. Brake fluid flows along a longitudinal direction of the groove space.

With this construction, at least one of the pair of side plates is further provided with a discharge fluid passage extending in an opposite direction to the gravity direction from the highest position of the groove space. The groove space and the discharge fluid passage may constitute the discharge port.

Further, each sealing member is arranged to come in contact with an inner circumference of the first groove but at least partly in no contact with an outer circumference of the first groove so that the groove space may be formed outside an outer circumference of the sealing member and within the outer circumference of the first groove.

Preferably, the side plates, that are arranged between adjacent two of the rotary pumps, come in contact with each other so as to be divided in a direction nearly perpendicular to an axis of the drive shaft. As the side plates between the adjacent two pumps are divided into two, adequate positioning of the parts and components of respective pumps are easily secured independently of each other.

A housing has a recess whose center axis is nearly perpendicular to the gravity direction. The pump is inserted into the recess in such a manner that the drive shaft is positioned in parallel with the center axis of the recess.

It is preferable to provide a first spring member, which is disposed between a bottom of the recess and a leading end of the pump in an inserting direction thereof into the recess, for urging the pump in a direction opposite to the inserting direction thereof into the recess. By urging the pump as mentioned above, the rotary pumps are rigidly held in the housing so that the drive shaft may be stably and smoothly rotated.

In addition to or in place of the first spring member, a second spring member may be disposed at an entrance of the recess for urging the pump in an inserting direction thereof into the recess. This also serves to rotate the drive shaft stably and smoothly.

Further, a screw member is, preferably, disposed at the entrance of the cylindrical recess for urging the pump in the inserting direction thereof into the recess to hold more rigidly the pumps in the housing.

In a case that the pump and the recess are respectively formed in a cylindrical shape, an inner circumference surface of the cylindrical recess may be provided with ring shaped second grooves, each of which is formed so as to surround an outer circumference of the pump and to communicate with any one of the intake ports and the discharge ports. The housing is provided with brake fluid passages each connected to the highest position of each of the second grooves so that air entered into the second grooves may be moved toward the highest position thereof and purged into the brake fluid passages.

The brake apparatus is further provided with a holder having a holder through hole, a motor having a motor shaft which is coupled with the drive shaft, and a bearing fitted to an inner circumference surface of the holder through hole and an inner circumference surface of the side plate hole. The motor is fixed, via the holder, to a surface of the housing where the recess is provided perpendicularly thereto in such a manner that the motor shaft may be positioned in a center axis line of the holder through hole. The bearing slidably holds at least one of the motor shaft and the drive shaft. With the construction mentioned above, the bearing serves to align center axes of the motor shaft and the drive shaft.

Preferably, the drive shaft is provided, at a leading end thereof, with a stopper restricting an excessive axial movement thereof so that the drive shaft may not get out of the pump.

Further, the drive shaft is provided with a plurality of key holes, each of which is longer in an axial direction of the drive shaft, and a plurality of keys, each of which is housed in each of the key holes so as to slide relatively to the drive shaft in an axial direction thereof but to transfer torque for driving the inner rotors from the drive shaft to the respective inner rotors. With the construction of key holes and keys mentioned above, even if the drive shaft is moved in an axial direction thereof, the keys are not pressed by the drive shaft so that the torque may be transferred to the inner rotors.

BRIEF DESCRIPTION OF THE DRAWING

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

Figure 1:
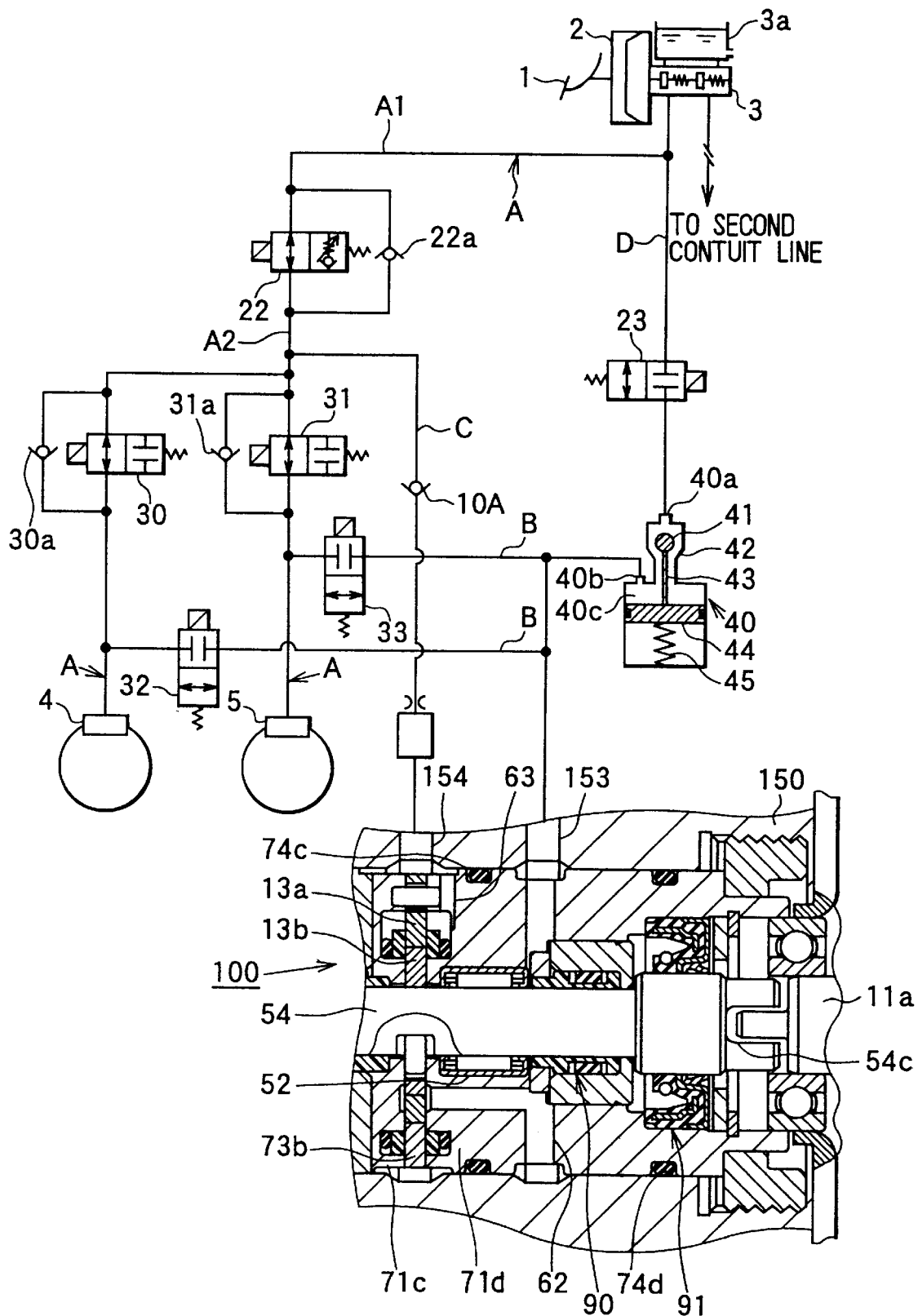
FIG. 1 is a view showing an outline structure of a brake apparatus according to a first embodiment of the present invention.

FIG. 1 shows an outline structure of a brake apparatus to which a trochoid pump is applied as a rotary pump. The basic constitution of the brake apparatus will be described with reference to FIG. 1. In this embodiment, a brake apparatus is applied to a vehicle provided with a hydraulic circuit of a diagonal conduit system having a first conduit connecting wheel cylinders of a front right wheel and a rear left wheel and a second conduit connecting wheel cylinders of a front left wheel and a rear right wheel. The vehicle is a four wheel vehicle of front wheel drive.

As shown in FIG. 1, a brake pedal 1 is connected to a booster 2. Brake depression force is boosted by the booster 2.

Further, the booster 2 is provided with a rod for transmitting boosted depression force to a master cylinder 3. In detail, the master cylinder 3 generates master cylinder pressure when the rod pushes a master piston arranged in the master cylinder 3. The brake pedal 1, the booster 2 and the master cylinder 3 correspond to a brake fluid pressure generating device.

The master cylinder 3 is provided with a master reservoir 3a for supplying brake fluid into the master cylinder 3 or storing extra brake fluid of the master cylinder 3.

Further, the master cylinder pressure is transmitted to a wheel cylinder 4 for a front right wheel (FR) and a wheel cylinder 5 for a rear left wheel (RL) via ABS devices. In the following explanation, the brake apparatus will be described with respect to the hydraulic circuit in the first conduit connecting the wheel cylinders of the front right wheel (FR) and the rear left wheel (RL). The explanation for the second conduit connecting the wheel cylinders of a front left wheel (FL) and a rear right wheel (RR) will be omitted since the hydraulic circuit in the second conduit is quite similar to that in the first conduit.

The brake apparatus is provided with a conduit (main conduit) A connected to the master cylinder 3. A linear differential pressure control valve 22 together with a relief valve 22a are disposed in the main conduit A. The main conduit A is divided into two portions by the linear differential pressure control valve 22. That is, the main conduit A is divided into a first conduit A1 from the master cylinder 3 to the proportioning valve 22 and a second conduit A2 from the valve 22 to the respective wheel cylinders 4 and 5.

The linear differential pressure control valve 22 serves to normally transmit pressure from a master cylinder side to a wheel cylinder side but, at a sudden braking to the wheel cylinders 4 and 5 when the master cylinder pressure is below a predetermined pressure or at a traction control, to hold a predetermined pressure difference between the master cylinder side and the wheel cylinder side. The linear differential pressure control valve 22 may adjust linearly a value of the predetermined difference pressure.

Further, the second conduit A2 branches out two conduits. A pressure increasing control valve 30 for controlling brake fluid pressure increase of the wheel cylinder 4 is disposed in one of the branched conduits and a pressure increasing control valve 31 for controlling brake fluid pressure increase of the wheel cylinder 5 is disposed in the other of the branched conduits.

The pressure increasing control valves 30 and 31 are two-position valves capable of controlling communicating and interrupting states by an electronic control unit (hereinafter referred to as ECU). When the two-position valves are controlled to a communicating state, the master cylinder pressure or brake fluid pressure produced by a pump 100 can be applied to the respective wheel cylinders 4 and 5. In the normal braking operation where ABS is not controlled by the ECU, the pressure increasing control valves 30 and 31 are always controlled in the communicating state.

Safety valves 30a and 31a are disposed in parallel with the pressure increasing control valves 30 and 31, respectively. The safety valves 30a and 31a allow the brake fluid to swiftly return from the wheel cylinders 4 and 5 to the master cylinder 3 when ABS control has been finished by stopping depression of the brake pedal 1.

Pressure reducing control valves 32 and 33 capable of controlling communicating and interrupting states by the ECU are respectively arranged at conduits B, each of which is connected to the second conduit A2 between the pressure increasing control valve 30 or 31 and the wheel cylinder 4 or 5 and to a reservoir 40. In the normal braking operation, the pressure reducing control valves 32 and 33 are always brought into an interrupting state.

A rotary pump 13 is arranged at a conduit C, which connects the reservoir 40 and the second conduit A2 between the linear differential pressure control valve 22 and the pressure increasing control valve 30 or 31. A safety valve 10A is disposed in the conduit C on a discharge port side of the rotary pump 13 to prevent return flow of brake fluid. A motor 11 is connected to the rotary pump 13 to drive the rotary pump 13. A detailed explanation of the rotary pump 13 will be given later.

An auxiliary conduit D is disposed to connect the reservoir 40 and the master cylinder 3. A two-position control valve 23 is disposed in the auxiliary conduit D. The control valve 23 is in an interrupting state in the normal braking operation. But when the control valve 23 is brought into a communicating state in a brake assist control operation or traction control operation and the auxiliary conduit D is communicated, the rotary pump 13 sucks the brake fluid of the first conduit A1 via the auxiliary conduit D and discharges it to the second conduits A2, whereby the brake fluid pressure of the wheel cylinders 4 and 5 are made higher than the master cylinder pressure. As a result, wheel braking forces of the wheel cylinders 4 and 5 are increased. The linear differential pressure control valve 22 works to hold the pressure difference between the master cylinder pressure and the wheel cylinder pressure.

The reservoir 40 is provided with a reservoir hole 40a, which is connected to the auxiliary conduit D and through which brake fluid flows from the auxiliary conduit D to the reservoir 40, and a reservoir hole 40b, which is connected to the conduits B and C and through which brake fluid released from the wheel cylinders 4 and 5 flows into the reservoir 40. A ball valve 41 is provided in the reservoir 40 inside the reservoir hole 40a. A rod 43 is provided in the reservoir 40 separately with the ball valve 41 for moving up and down the ball valve 41 with a predetermined stroke.

Further, a reservoir chamber 40c is provided with a piston 44, which moves together with the rod 43, and a spring 45, which presses the piston 44 toward the ball valve 41 and generates a force in a direction of pushing out brake fluid from the reservoir chamber 40c.

When a predetermined amount of brake fluid is stored in the reservoir 40, the ball valve 41 is seated on a valve seat 42 not to flow any more brake fluid into the reservoir 40. Therefore, brake fluid exceeding intake capacity of the rotary pump 13 cannot flow into the reservoir chamber 40c. Accordingly, high pressure is never applied to an intake side of the rotary pump 13.

Figure 2:
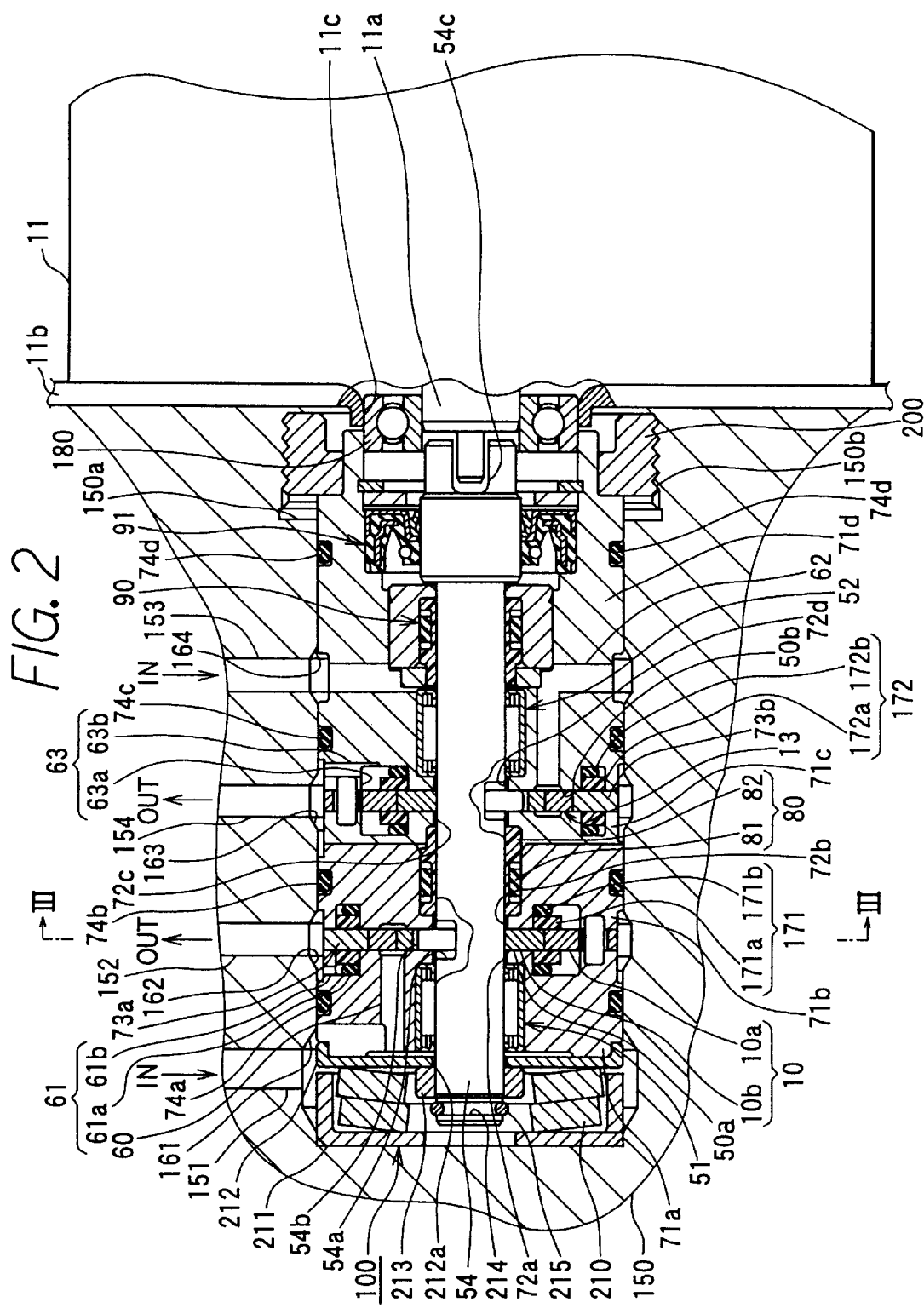
FIG. 2 is a sectional view of a pump of the brake apparatus shown in FIG. 1.

The structure of the pump 100 including rotary pumps 10 and 13 will be described with reference to FIG. 2. FIG. 2 shows the pump 100 assembled in the ABS actuator and an upper direction in FIG. 2 is opposite to gravity direction.

As mentioned above, the brake apparatus is constituted by two line systems comprising the first and second conduit line systems. The pump 100 is provided with the rotary pump 13 for the first conduit line system shown in FIGS. 1 and 2 and a rotary pump 10 for the second conduit line system shown in FIG. 2. The rotary pumps 10 and 13 are driven by a drive shaft 54.

A casing constituting a body of the pump 100 is composed of first, second, third and fourth cylinders (side plates) 71a, 71b, 71c and 71d and first and second center plates 73a and 73b.

The first cylinder 71a, the first center plate 73a, the second cylinder 71b, the third cylinder 71c, the second center plate 73b and the fourth cylinder 71d are piled up in order and each circumferential boundary of the cylinders and plates put on top of each other is welded to constitute an integrated body of the pump 100. The integrated body of the pump 100 is put into a recess 150 formed in a near cylindrical shape in a housing for the ABS actuator. The pump 100 is fixed to the housing 150 by driving a ring shaped male screw member 200 in a female threaded groove formed at an entrance of the recess 150a.

A plate spring (disc spring) 210 is disposed between a bottom of the recess 150a and a top end of the pump 100 in an inserting direction thereof into the recess 150a. The plate spring 210 generates a force urging the pump 100 in an axial direction thereof (force biasing the pump 100 against the inserting direction thereof). A relatively large biasing force of the plate spring 210 becomes necessary to rigidly fix the pump 100 to the housing 150 to an extent that the pump 100 does not vibrate in the housing 150 due to brake fluid high pressure generated when the pump intakes and discharges brake fluid.

Only tightening the male screw member 200 causes a fluctuation of the force acting in the axial direction of the pump 100 and the plate spring 210 serves to secure a stable axial force biasing the pump 100, which is sufficient not to rattle the pump 100 in the recess 150a by adequately adjusting an axially screwing length of the male screw member 200.

A case 211, with which the plate spring 210 partly comes in contact, is disposed between the bottom of the recess 150a and the plate spring 210. The case 211 serves to scatter a large force transmitted from the periphery of the plate spring 210 to a wider spread area so that the large force may not be concentrated on a limited area of the bottom of the recess 150a.

Further, a ring shaped plate 212, with which the plate spring 210 partly comes in contact, is disposed between the first cylinder 71a and the plate spring 210. The plate 212 serves to scatter a large force transmitted from the periphery of the plate spring 210 to a wider spread area so that the large force may not be concentrated on a limited area of the first cylinder 71a. A leading end of the drive shaft 54 is inserted into a center hole 212a of the plate 212.

A ring shaped stopper 213 is fitted to the drive shaft 54 on a bottom side of the recess 150a with respect to the plate 212. An outer diameter of the stopper 213 is larger that a diameter of the center 212a of the plate 212 so that an axial movement of the drive shaft 54 in a right direction in FIG. 2 may be restricted by the plate 212 with which the stopper 213 comes in contact. The drive shaft 54 is provided at a circumference of a leading end thereof with a groove 214. A C ring 215 is disposed in the groove 214 and restricts a movement of the stopper 213 in a direction of getting out of the leading end of the drive shaft 54.

The first, second, third and fourth cylinders 71a, 71b, 71c and 71d are respectively provided with first, second, third and fourth center bores 72a, 72b, 72c and 72d. A first bearing 51 is disposed at the internal periphery of the first center bore 72a and a second bearing 52 is disposed at the internal periphery of the fourth center bore 72c. The drive shaft 54 inserted through the first, second, third and fourth center bores 72a, 72b, 72c and 72d is held by the first and second bearings 51 and 52. Consequently, the two rotary pumps 10 and 13 may be put between the bearings 51 and 52.

Figure 3:
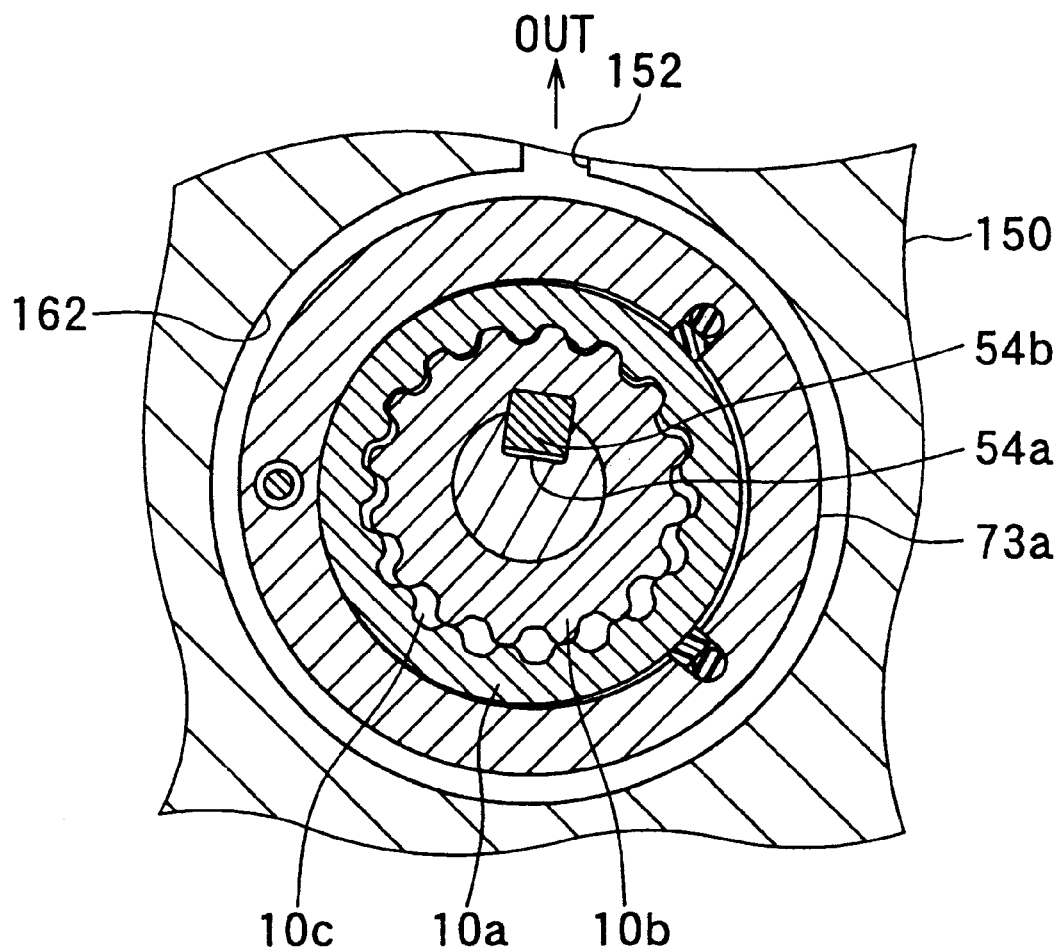
FIG. 3 is a sectional view taken along a line III—III of FIG. 2.

The structure of the rotary pumps 10 and 13 are described hereinafter with reference to FIGS. 2 and 3.

The rotary pump 10 is housed in a rotor room 50a constructed by putting the first cylindrical center plate 73a, as an end wall of the rotor room 50a, between the first and second cylinders 71a and 71b, as both side walls of the rotor room 50a. The rotary pump 10 is an internal gear pump driven by the drive shaft 54. The rotary pump 10 has a rotating portion composed of an inner rotor 10b whose outer circumference is provided with external gears, an outer rotor 10a whose inner circumference is provided with internal gears. An axis of the drive shaft 54 is inserted into a center hole of the inner rotor 10b.

Further, the drive shaft 54 is provided with key holes 54a, each of which elongates in an axial direction of the drive shaft 54, and a key 54b, which is housed in the key hole 54a so as to slide relatively to the drive shaft in an axial direction thereof but to transfer torque from the drive shaft 54 to the inner rotor 10b.

A plurality of space rooms 10c are formed between the external and internal gears 10a and 10b in mesh. According to a rotation of the drive shaft 54, volumes of the plurality of the space rooms 10 are changed respectively so that brake fluid may be sucked and discharged.

The rotary pump 13 is housed in a rotor room 50b constructed by putting the second cylindrical center plate 73b, as an end wall of the rotor room 50b, between the third and fourth cylinders 71c and 71d, as both side walls of the rotor room 50b. The rotary pump 13 is an internal gear pump driven by the drive shaft 54, which is same as the rotary pump 10. The rotary pump 13 is positioned at a place where the rotary pump 10 is rotated by 180° around the drive shaft 54. Accordingly, respective positions of the intake and discharge side space rooms 10c of the rotary pump 10 and those of the rotary pump 13 are symmetrical with respect to the axis of the drive shaft 54. As a result, forces acting on the drive shaft 54 due to high pressure of brake fluid on the respective discharge sides of the rotary pumps 10 and 13 may be cancelled out.

The first cylinder 71a is provided with an intake port 60, which communicates to the intake side space rooms 10c of the rotary pump 10, and a discharge port 61, which communicates to the discharge side space rooms 10c thereof. The intake port 60 penetrates from an end surface of the first cylinder 71a on a side of the rotary pump 10 to the other end surface thereof and, on the other end surface thereof, extends in an opposite direction to gravity direction to an outer circumference surface of the first cylinder 71a. Brake fluid is sucked from the intake port 60 on a side of the outer circumference surface of the first cylinder 71a as an entrance.

The intake port 60 is connected to an intake brake fluid passage 151 provided in the housing 150 via a ring shaped groove 161 which is formed on an inner circumference surface of the cylindrical recess of the housing 150 so as to surround all over an outer circumference of the first cylinder 71a.

The discharge port 61 is provided on end surfaces of the first and second cylinders 71a and 71b on a side of the rotating portion of the rotary pump 10 to extend to the outer circumference surfaces thereof. More details of the discharge port 61 are described below.

Ring shaped grooves 61a (first grooves) are provided respectively on the end surface of the first and second cylinders 71a and 71b on a side of the rotating portion of the rotary pump 10 so as to surround the drive shaft 54.

A pair of ring shaped sealing members 171 are disposed in the respective ring shaped grooves 61a in a manner that outer and inner rotors 10a and 10b are put there between. Each of the sealing members 171 is composed of a resin member 171a arranged on a side of the rotating portion of the rotary pump 10 and a rubber member 171b which presses the resin member 171a toward the rotating portion of the rotary pump 10. Inside an inner circumference of the sealing member 171, there include the intake side space rooms 10c and a gap between the outer circumference of the outer rotor 10a and the inner circumference of the center plate 73a which faces to the intake side space rooms 10c. Outside an outer circumference of the sealing member 171, there include the discharge side space rooms 10c and a gap between the outer circumference of the outer rotor 10a and the inner circumference of the center plate 73a which faces to the discharge side space rooms 10c. That is, the sealing member 171 serves to seal a relatively low pressure inside portion from a relatively high pressure outside portion.

The sealing member 171 is arranged to come in contact with an inner circumference of the groove 61a but at least partly comes in no contact with an outer circumference of the groove 61a. Accordingly, a groove space may be formed outside an outer circumference of the sealing member 171 and within the outer circumference of the groove 61a. Further, the first cylinder 71a is provided with a passage 61b extending in an opposite direction to the gravity direction from the highest position of the groove space. The groove space and the passage 61b constitute the discharge port 61.

The discharge port 61 communicates to a discharge brake fluid passage 152 provided in the housing 150 via a ring shaped groove 162 which is formed on an inner circumference surface of the cylindrical recess of the housing 150 so as to surround all over an outer circumference of the first center plate 73a.

The fourth cylinder 71d is provided with an intake port 62, which communicates to the intake side space rooms 10c of the rotary pump 13, and a discharge port 63, which communicates to the discharge side space rooms 10c thereof. The intake port 62 penetrates from an end surface of the fourth cylinder 71d on a side of the rotary pump 13 to an outer circumference surface of the first cylinder 71a. In more details, the intake port 62 extends in an opposite direction to gravity direction after extending in parallel with the drive shaft 54 from the intake side space rooms 10c. Brake fluid is sucked from the intake port 62 on a side of the outer circumference surface of the fourth cylinder 71d as an entrance.

The intake port 62 is connected to an intake brake fluid passage 153 provided in the housing 150 via a ring shaped groove 164 which is formed on an inner circumference surface of the cylindrical recess of the housing 150 so as to surround all over an outer circumference of the fourth cylinder 71d.

The intake port 62 communicate with the center bore 72d. Therefore, brake fluid may reach the drive shaft 54 and the bearing 52 so that the drive shaft 54 may be rotated smoothly. Further, when air is entered into the center bore 72d from outside, the air may be evacuated trough the intake port 62. The intake port 62 is positioned on a side of the motor 11 with respect to the discharge port 63 to arrange the lower pressure brake fluid passage portion at a place nearer to the outside of the housing 150.

The discharge port 63 is provided on end surfaces of the third and fourth cylinders 71c and 71d on a side of the rotating portion of the rotary pump 13 to extend to the outer circumference surfaces thereof. The construction of the discharge port 63 is similar to that of the discharge port 61. A ring shaped sealing member 172 comprising a resin member 172a and a rubber member 172b is housed in a ring shaped groove 63a provided in each of the third and fourth cylinders 71c and 71d. The discharge port 63 is constituted by a groove space formed outside an outer circumference of the sealing member 172 and within an outer circumference of the ring shaped groove 63a, and a passage 63b extending in an opposite direction to the gravity direction from the highest position of the groove space of the groove 63a. The discharge port 63 communicates to a discharge brake fluid passage 154 provided in the housing 150 via a ring shaped groove 163 which is formed on an inner circumference surface of the cylindrical recess of the housing 150 so as to surround all over an outer circumference of the second center plate 73b.

As mentioned above, as the intake ports 60 and 62 and the discharge ports 61 and 63 extend respectively in an opposite direction to the gravity direction, air, which is entered into the rotary pumps 10 and 13, may be evacuated in the direction opposite to the gravity direction.

Further, the intake brake fluid passages 151 and 153 and the discharge brake fluid passages 152 and 154 extend respectively in an opposite direction to the gravity direction (in an upper direction in FIG. 2). Accordingly, air, which is entered into the rotary pumps 10 and 13, may be evacuated to an outside of the pump 100 through the intake brake fluid passages 151 and 153 and the discharge brake fluid passages 152 and 154.

Furthermore, as each of the intake brake fluid passages 151 and 153 and the discharge brake fluid passages 152 and 154 is connected to each of the ring shaped grooves 161 to 164 at the highest position thereof and, at the discharge ports 61 and 63, as each of the passages 61b and 63b is connected to each of the ring shaped grooves 61a and 63a at the highest position thereof, air is not stagnant in the grooves 161 to 164, 61a and 63a.

The intake brake fluid passage 153 and the discharge brake fluid passage 154, which are shown in FIG. 2, correspond to the conduit C in FIG. 1.

Each of the second and third center bores 72b and 72c of the second and third cylinders 71b and 71c is partly provided with a large diameter portion whose diameter is larger than that of the drive shaft 54. A sealing member 80 is contained in the large diameter portions of the second and third center bores 72b and 72c for sealing in order to shut off brake fluid communication between the rotary pumps 10 and 13. The sealing member 80 is composed of a ring shaped resin element 82 having a ring shaped groove at an outer circumference thereof and an elastic O ring 81 housed in the ring shaped groove of the resin element 82. The resin element 82 is urged toward the drive shaft 54 by an elastic force of the O ring 81. Further, cross sections of the large diameter portion of the third center bore 72c and the resin element 82 contained in the large diameter portion of the third center bore 72c are formed in a shape that a part of a circle is cut off to form a chord of an arc. The chord of the arc of the resin element serves as a key so that the sealing member 80 may not rotate relatively to the third cylinder 71c.

The fourth cylinder 71d is provided on a surface opposite to a surface facing to the second center plate 73a with an entrace recess, into which the drive shaft 54 protrudes. A key groove 54c is formed at a leading end of the drive shaft 54 protruded into the entrance recess of the fourth cylinder 71d. A motor shaft 11a of the motor 11 is coupled with the key groove 54c. The motor 11 drives the drive shaft 54 through the motor shaft 11a and the key groove 54c so that the rotary pumps 10 and 13 may be driven. The motor 11 is fixed via a holder 11b to a surface of the housing 150 where the recess 150a is provided perpendicularly thereto. The holder 11b has a holder through hole 11c and the motor shaft 11a is positioned in a center of the holder through hole 11c. A diameter of the entrance recess of the fourth cylinder 71d is same to that of the holder through hole 11c. A gap between an axial end of the entrance recess and an axial end of the holder through hole 11c is relatively small and a bearing 180 is fitted to inner circumference surfaces of the entrance recess and the holder through hole 11c so as to hold the motor shaft 11a. The bearing 180 may hold the drive shaft 54 instead of the motor shaft 11a.

With the construction of the bearing 180 mentioned above, the motor shaft 11 may be easily aligned to the drive shaft 54 in order to minimize a radial positioning deviation between the motor shaft 11a and the drive shaft 54.

Oil seal 90 and 91 are provided axially in series in the fourth center bore 72d (including the entrance recess) to surround the outer circumference of the drive shaft 54. The oil seal 90 serves to prevent brake fluid leakage from the intake port 62 through a gap between the fourth center bore 72d and the drive shaft 54. The oil seal 91 serves to seal brake fluid leaked through the fourth center bore 72d when the oil seal 90 is damaged. O rings 74a, 74b, 74c and 74d are provided in outer circumferences of the first, second and fourth cylinders 71a, 71b and 71d, respectively. The O rings 74a to 74d serve to seal such that brake fluid of the respective intake and discharge brake fluid passages 151 to 154 do not interfere with each other in the recess 150a and are arranged between intake brake fluid passage 151 and the discharge brake fluid passage 152, between the discharge brake fluid passage 152 and the discharge brake fluid passage 154, between the discharge brake fluid passage 154 and the intake brake fluid passage 153, and between the intake brake fluid passage 153 and outside the housing 150, respectively.

The fourth cylinder 71d is provided on a side of the entrance recess with a step portion whose diameter is smaller. The ring shaped male screw member 200 is seated on the step portion so that the pump 100 is rigidly fixed in the recess 150a.

Next, operations of the brake apparatus and the pump 100 are described.

When the ABS control is executed for a symptom of a wheel lock, or when a larger braking force is required, for example, in a case that a braking force corresponding to a depressing force of the brake pedal cannot be obtained or a depressing speed of the brake pedal 1 is high, the brake apparatus operates to drive the pump 100 so as to suck brake fluid from the reservoir 40 and discharge brake fluid so that pressure of the wheel cylinders 4 and/or 5 may increase.

In this case, the pump 100 performs a basic operation that the rotary pumps 10 and 13 suck brake fluid from the intake brake fluid passages 151 and 153 and discharge brake fluid to the discharge brake fluid passages 152 and 154. At this moment, a large pressure is generated in each of the rotary pumps 10 and 13 on a discharge side thereof. Accordingly, brake pressure is operative in a direction that the pump 100 gets out of the housing 150. However, as the pump 100 is rigidly fixed in the housing 150 due to the axial force by the plate spring 210 and the male screw member 200, the pump 100 does not rattle in the housing 150.

Further, brake fluid pressure is also applied to the drive shaft 54 in a direction that the drive shaft 54 gets out of the pump 100 (in a right direction in FIG. 2) and the drive shaft 54 receives a force corresponding to a radial cross sectional area of the drive shaft 54. However, the stopper 213 disposed at the leading end of the drive shaft 54 comes in contact with a plate 212 disposed at an inserting front end of the first cylinder 71a so that an axial movement of the drive shaft 54 in the direction that the drive shaft gets out of the pump 100.

According to the embodiment mentioned above, a length during which the key 54b for transmitting torque to the inner rotor 10b is axially movable in the key hole 54a of the drive shaft 54 is longer than a length during which the stopper 213 actually moves to come in contact with the plate 212. As a result, even if the drive shaft 54 moves axially in the direction of getting out of the pump 100, the key 54b does not receive an axial force from the drive shaft 54 so that the key 54b may not hit the second cylinder 71b or the fourth cylinder 71d and, thus, the torque may be smoothly transmitted to the rotating portion.

Moreover, the C ring 215 is provided in the drive shaft 54 on a side of the leading end thereof with respect to the stopper 213. The C ring 215 serves to prevent the stopper 213 from getting out of the drive shaft 54 so that the drive shaft 54 may not get out of the pump 100.

Figure 4:
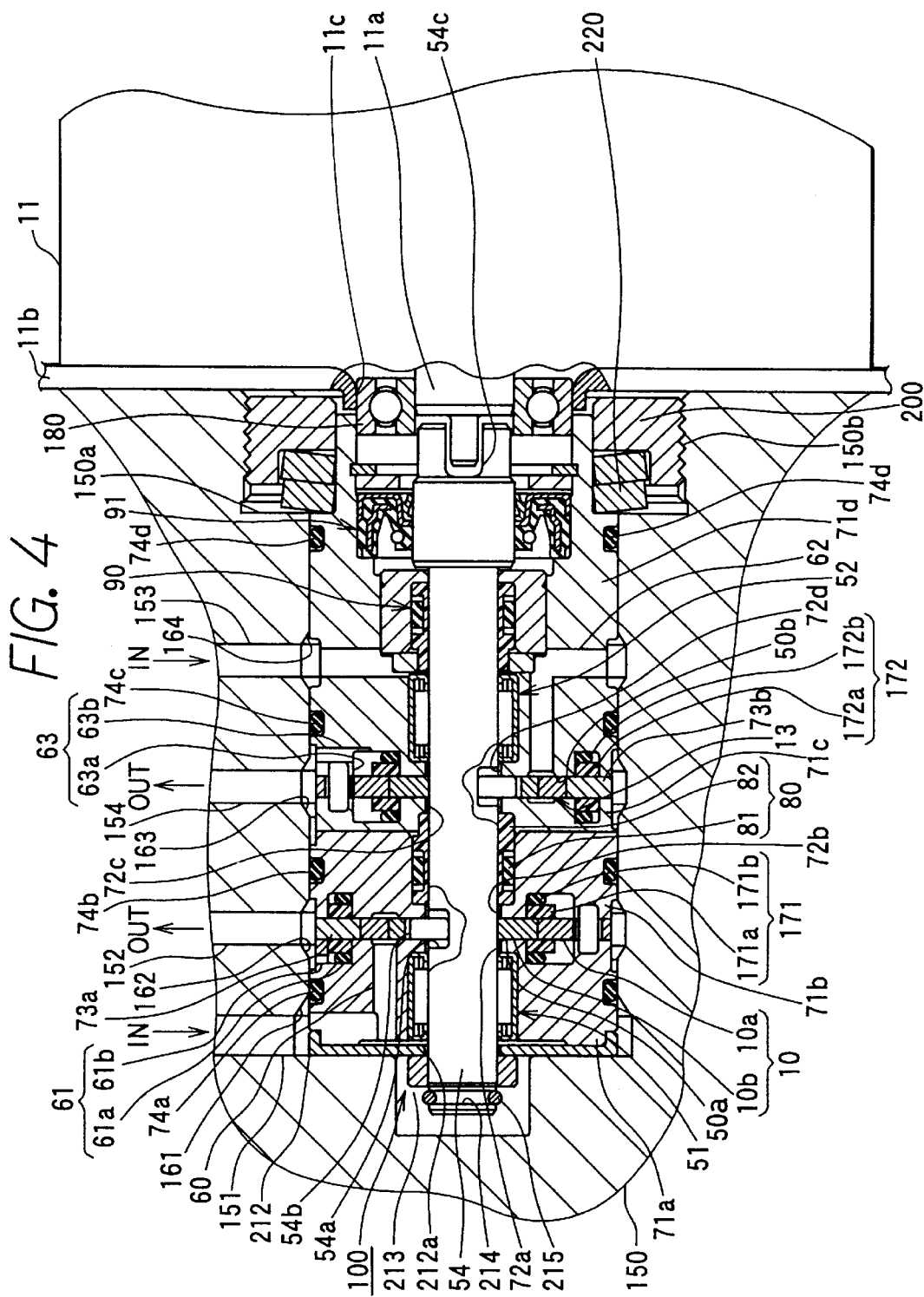
FIG. 4 is a sectional view of a pump of a brake apparatus according to a second embodiment of the present invention.

A second embodiment of the present invention is described with reference to FIG. 4. According to the second embodiment, a plate spring 220 is disposed between the step portion of the fourth cylinder 71d and the male screw member 200, in place of the plate spring 210 disposed between the bottom of the recess 105a of the housing 105 and the inserting end of the pump 100 according to the first embodiment. With the construction of the plate spring 220, driving the male screw member 200 causes to exert an axial force to the pump 100 due to the elastic force of the plate spring 220 so that the pump 100 may be rigidly fixed in the housing 150.

Further, the second and third cylinders 71b and 71c may be formed in an integrated shape without dividing perpendicularly to an axis of the drive shaft 54 into two bodies as shown in the embodiments mentioned above. It is rather complicated to install the sealing member 80 in the center bore of the integrated second and third cylinders 71b and 71c so as not to rotate with the drive shaft 54.

However, in a case that the second and third cylinders 71b and 71c are made by the two bodies, the installation of the sealing member 80 becomes easier, since the larger diameter portion of the third center bore 72c, which is formed in a shape that a part of a circle is cut off to form a chord of an arc, may be provided to extend axially from the end of the third cylinder 71c and the resin element 82, which has the same shape as the larger diameter portion and protrudes from the end of the second cylinder 71b, may be inserted into the larger diameter portion.

Further, the larger diameter portions of the second and third cylinders 71b and 71c in which the sealing member 80 is contained do not touch the rotating portions of the rotary pumps 10 and 13 so that the sealing member 80 may not be worn down by rotations of the rotating members.

Furthermore, the first cylinder 71a, the first center plate 73a, the second cylinder 71b, the third cylinder 71c, the second center plate 73b and the fourth cylinder 71d are integrated into one body to constitute the pump 100 by laminating in order and welding the respective boundaries of laminated cylinders and plates. To optimize the respective outputs of the rotary pumps 10 and 13, it is necessary to adequately position and align the respective outer and inner rotors 10a and 10b, the center plates 73a and 73b and the first to fourth cylinders 71a to 71d. If the second and third cylinders 71b and 71c are integrated into one body, it becomes difficult to adequately position independently the respective parts and components with respect to the rotary pumps 10 and 13. However, in a case that the second and third cylinders 71b and 71c are divided into two bodies as mentioned before, these parts and components may be independently positioned.

Moreover, according to the embodiments mentioned above, the stopper 213 and the C ring 215 are provided at the leading end of the drive shaft 54, the stopper 213 may be eliminated. In this case, the C ring 215 plays a role as the stopper in a manner that the plate 212 comes in contact with the C ring 215 when the drive shaft 54 moves axially.

Further, in place of driving the male screw member 200 into the female screw groove 150b provided in the recess 150a, the pump 100 may be rigidly fixed in the housing 150 by the other method, for example, by caulking internal periphery surface of the recess 150a.

What is claimed is:

1. A vehicle brake apparatus with a pump, the pump comprising:

a plurality of rotary pumps, each of which has
a rotating portion composed of an outer rotor whose inner circumference is provided with internal gears, an inner rotor whose outer circumference is provided with external gears and a plurality of spaces formed between the internal and external gears in mesh, and
a casing for housing the rotating portion, which is provided with an intake port through which brake fluid is sucked to the rotating portion, a discharge port through which brake fluid is discharged from the rotating portion, and a casing through hole;
wherein each of the intake and discharge ports of the rotary pumps extends in an opposite direction to the gravity direction to a highest position of the casing, and each of the brake fluid passages extends straight from the highest position of the casing perpendicularly to an axis of the drive shaft and in the direction opposite to the direction of gravity;
a drive shaft for driving the plurality of the rotary pumps, which is rotatably inserted into the casing through hole and coupled with the respective inner rotors of the plurality of the rotary pumps; and
a housing having a recess in which the pump is accommodated so that the drive shaft is positioned perpendicularly to a direction of gravity, the housing having brake fluid passages connected to the respective intake and discharge ports of the rotary pump.

2. A vehicle brake apparatus with a pump, the pump comprising:

a plurality of rotary pumps, each of which has
a rotating portion portion composed of an outer rotor whose inner circumference is provided with internal gears, an inner rotor whose outer circumference is provided with external gears and a plurality of spaces formed between the internal and external gears in mesh, and
a casing for housing the rotating portion, which is provided with an intake port through which brake fluid is sucked to the rotating portion, a discharge port through which brake fluid is discharged from the rotating portion, and a casing through hole;
wherein each of the intake and discharge ports of the rotary pumps extends in an opposite direction to the gravity direction to a highest position of the casing, and each of the brake fluid passages extends straight from the highest position of the casing perpendicularly to an axis of the drive shaft and in an direction opposite to the direction of gravity,
a drive shaft for driving the plurality of the rotary pumps, which is rotatably inserted into the casing through hole and coupled with the respective inner rotors of the plurality of the rotary pumps;
a housing having a recess in which the pump assembly is accommodated so that the drive shaft is positioned perpendicularly to a direction of gravity, the housing having brake fluid passages connected to the respective intake and discharge ports of the rotary pump,
wherein each of the casings of the rotary pumps comprises a center plate having a bore in which the rotating portion is housed, and a pair of side plates between which the center plate is put, each of the side plates being provided, at a center thereof, with a side plate through hole and, further, provided, at an end surface thereof on a side of the rotating portion, with a ring shaped first groove formed so as to surround the drive shaft, the side plate through hole constituting the casing through hole, further comprising:
a plurality of sealing members each disposed in the first groove of each of the side plates so that the inner and outer rotors of each of the rotary pumps may be put between two of the sealing members and that a groove space may be formed between the first groove and the sealing member in each of the side plates, brake fluid flowing along a longitudinal direction of the groove space,
wherein at least one of the side plates is further provided with a discharge fluid passage extending in an opposite direction to the gravity direction from the highest position of the groove space, the discharge port being constituted by the groove space and the discharge fluid passage.

3. A brake apparatus according to claim 2, wherein each sealing member is arranged to come in contact with an inner circumference of the first groove but at least partly in no contact with an outer circumference of the first groove so that the groove space may be formed outside an outer circumference of the sealing member and within the outer circumference of the first groove.

4. A brake apparatus according to claim 2, wherein the side plates, that are arranged between adjacent two of the rotary pumps, come in contact with each other so as to be divided in a direction nearly perpendicular to an axis of the drive shaft.

5. A vehicle brake apparatus with a pump, the pump comprising:

a plurality of rotary pumps, each of which has
a rotating portion composed of an outer rotor whose inner circumference is provided with internal gears, an inner rotor whose outer circumference is provided with external gears and a plurality of space rooms formed between the internal and external gears in mesh, and
a casing for housing the rotating portion, which is provided with an intake port through which brake fluid is sucked to the rotating portion, a discharge port through which brake fluid is discharged from the rotating portion, and a casing through hole;
wherein each of the intake and discharge ports of the rotary pumps extends in an opposite direction to the gravity direction to a highest position of the casing, and each of the brake fluid passages extends straight from the highest position of the casing perpendicularly to an axis of the drive shaft and in an opposite direction to the gravity direction;

a drive shaft for driving the plurality of the rotary pumps, which is rotatably inserted into the casing through hole and coupled with the respective inner rotors of the plurality of the rotary pumps;

a housing having a recess whose center axis is nearly perpendicular to the gravity direction, the pump being inserted into and held in the recess in such a manner that the drive shaft is positioned in parallel with the center axis of the recess, wherein the pump and the recess are respectively formed in a cylindrical shape, the housing being provided with ring shaped second grooves each formed on an inner circumference surface of the cylindrical recess so as to surround an outer circumference of the pump and to communicate with any one of the intake ports and the discharge ports; and a first spring member, which is disposed between a bottom of the recess and a leading end of the pump in an inserting direction thereof into the recess, for urging the pump in a direction opposite to the inserting direction thereof into the recess.

6. A brake apparatus according to claim 1, wherein each of the casings of the rotary pumps comprises a center plate having a bore in which the rotating portion is housed, and a pair of side plates between which the center plate is put so that each of the side plates is provided, at a center thereof, with the casing through hole, and, further, wherein the side plates that are arranged between adjacent ones of the rotary pumps, come in contact with each other so as to be divided in a direction nearly perpendicular to the axis of the drive shaft.

7. A brake apparatus according to claim 1, further comprising:

a holder having a holder through hole;
a motor having a motor shaft coupled with the drive shaft, the motor being fixed via the holder to a surface of the housing; and
a bearing fitted to an inner circumference surface of the holder through hole and an inner circumference surface of the casing through hole,
wherein the bearing slidably holds at least one of the motor shaft and the drive shaft.

8. A vehicle brake apparatus with a pump, the pump comprising:

a plurality of rotary pumps, each of which has
a rotating portion composed of an outer rotor whose inner circumference is provided with internal gears, an inner rotor whose outer circumference is provided with external gears and a plurality of space rooms formed between the internal and external gears in mesh, and
a casing for housing the rotating portion, which is provided with an intake port through which brake fluid is sucked to the rotating portion, a discharge port through which brake fluid is discharged from the rotating portion, and a casing through hole;
wherein each of the intake and discharge ports of the rotary pumps extends in an opposite direction to the gravity direction to a highest position of the casing, and each of the brake fluid passages extends straight from the highest position of the casing perpendicularly to an axis of the drive shaft and in the opposite direction to the gravity direction;

a drive shaft for driving the plurality of the rotary pumps, which is rotatably inserted into the casing through hole and coupled with the respective inner rotors of the plurality of the rotary pumps;

a housing having a recess whose center axis is nearly perpendicular to the gravity direction, the pump being inserted into and held in the recess in such a manner that the drive shaft is positioned in parallel with the center axis of the recess, wherein the pump and the recess are respectively formed in a cylindrical shape, the housing being provided with ring shaped second grooves each formed on an inner circumference surface of the cylindrical recess so as to surround an outer circumference of the pump and to communicate with any one of the intake ports and the discharge ports; and a second spring member disposed at an entrance of the recess for urging the pump in an inserting direction thereof into the recess.

9. The vehicle brake apparatus of claim 1 further including:

a master cylinder for generating master cylinder pressure;
a main conduit that provides fluid communication between the master cylinder and a wheel cylinder; and
a linear differential pressure control valve disposed in the main conduit between the master cylinder and the wheel cylinder, the linear differential pressure control valve being for regulating a pressure difference between the master cylinder and the wheel cylinder.

10. The vehicle brake apparatus of claim 9 further including:

a reservoir for receiving a fluid from the wheel cylinder;
an auxiliary conduit permitting fluid communication between the reservoir and the master cylinder; and
a second conduit for permitting fluid communication between the reservoir and the wheel cylinder.

11. The vehicle brake apparatus of claim 10, wherein the pump sucks brake fluid from the reservoir and discharges brake fluid to the wheel cylinder upon activation.

* * * * *